United States Patent [19]
Mills et al.

[11] Patent Number: 6,055,560
[45] Date of Patent: Apr. 25, 2000

[54] SYSTEM AND METHOD TO PROVIDE INTERACTIVITY FOR A NETWORKED VIDEO SERVER

[75] Inventors: William Allen Mills, Ijamsville, Md.; Tien Haphi Nguyen, Clifton, Va.; Tien Michael Nguyen, Columbia, Md.; Frank L. Stein, Vienna, Va.; Srivatsa Krishnaswamy, Bangalore, India

[73] Assignee: International Business Machines Corporation, Armonk, N.Y.

[21] Appl. No.: 08/745,342

[22] Filed: Nov. 8, 1996

Related U.S. Application Data

[63] Continuation of application No. 08/745,342, Nov. 6, 1996, abandoned.

[51] Int. Cl.$^7$ .................................................. G06F 15/16
[52] U.S. Cl. ........................ 709/200; 348/12; 345/327
[58] Field of Search ........................ 395/200.5, 806, 395/119; 348/13, 7, 8, 6, 1, 9, 12; 370/396, 522, 397, 259, 85.4, 432; 455/4.2; 379/207, 142; 709/231; 380/25; 707/104; 364/401

[56] References Cited

U.S. PATENT DOCUMENTS

| | | | |
|---|---|---|---|
| 4,381,522 | 4/1983 | Lambert | 358/86 |
| 4,931,950 | 6/1990 | Isle et al. | 364/513 |
| 4,995,078 | 2/1991 | Monslow et al. | 380/10 |
| 5,508,732 | 4/1996 | Bottomley et al. | 348/7 |
| 5,550,735 | 8/1996 | Slade et al. | 364/401 |
| 5,583,563 | 12/1996 | Wanderscheid et al. | 348/13 |
| 5,583,920 | 12/1996 | Wheeler, Jr. | 379/88 |
| 5,592,477 | 1/1997 | Farris et al. | 370/396 |
| 5,654,747 | 8/1997 | Ottesen et al. | 348/12 |
| 5,666,293 | 9/1997 | Metz et al. | 395/200.5 |
| 5,708,961 | 1/1998 | Hylton et al. | 455/4.2 |
| 5,724,492 | 3/1998 | Matthews, III et al. | 395/119 |
| 5,729,549 | 3/1998 | Kostreski et al. | 370/522 |
| 5,758,085 | 5/1998 | Kouoheris et al. | 709/231 |
| 5,790,171 | 8/1998 | Klopfer et al. | 348/6 |
| 5,790,173 | 8/1998 | Strauss et al. | 348/7 |
| 5,790,176 | 8/1998 | Craig | 348/13 |
| 5,793,414 | 8/1998 | Shaffer | 348/13 |
| 5,798,795 | 8/1998 | Hendricks et al. | 348/1 |
| 5,802,526 | 9/1998 | Fawcett et al. | 707/104 |
| 5,805,804 | 9/1998 | Laursen et al. | 709/200 |
| 5,815,146 | 9/1998 | Youden et al. | 345/327 |
| 5,818,512 | 10/1998 | Fuller | 348/8 |
| 5,825,862 | 10/1998 | Voit et al. | 379/142 |
| 5,826,102 | 10/1998 | Escobar et al. | 395/806 |
| 5,826,166 | 10/1998 | Brooks et al. | 455/5.1 |
| 5,877,755 | 3/1999 | Hellhake | 345/327 |
| 5,878,141 | 3/1999 | Daly et al. | 380/25 |
| 5,880,720 | 3/1999 | Iwafune et al. | 345/327 |
| 5,892,535 | 4/1999 | Allen et al. | 348/9 |
| 5,907,323 | 5/1999 | Lawler et al. | 345/327 |

*Primary Examiner*—Le Hien Luu
*Assistant Examiner*—Thong Vu
*Attorney, Agent, or Firm*—Morgan & Finnegan, LLP; Joseph C. Redmond, Jr.

[57] ABSTRACT

An interactive video system supports functions typically expected with a VCR such as play, pause, fast forward and rewind. A set top box is coupled to a display terminal and a first interface. The set top box includes a memory for storing an operating system in set top enabling codes. A video dial tone network includes a control channel and a data channel coupled to a second interface linked to the first interface. A first gateway controls establishment of a video session between a video server and the display terminal. A second gateway establishes connection between the video server and the set top box over a data channel in response to an input from the first gateway. An application server coupled to the first gateway and the video server contains executable code for transferring video data, video and audio information from the video server to the display terminal. The application server includes a shared queue coupled to a plurality of application engines and set top boxes and includes program code for multi-tasking operation. The code operates the application engines in response to application tables to provide video transmission as a panel object indicative of the state of set top boxes in a video session.

21 Claims, 11 Drawing Sheets

APPLICATION EXECUTION

CONNECTION ESTABLISHMENT

INTERACTIVE SOFTWARE FLOW

SET TOP ENABLING CODE DOWNLOAD

SEND FIRST PANEL DEFINITION

SEND OBJECTS

RUN PANEL

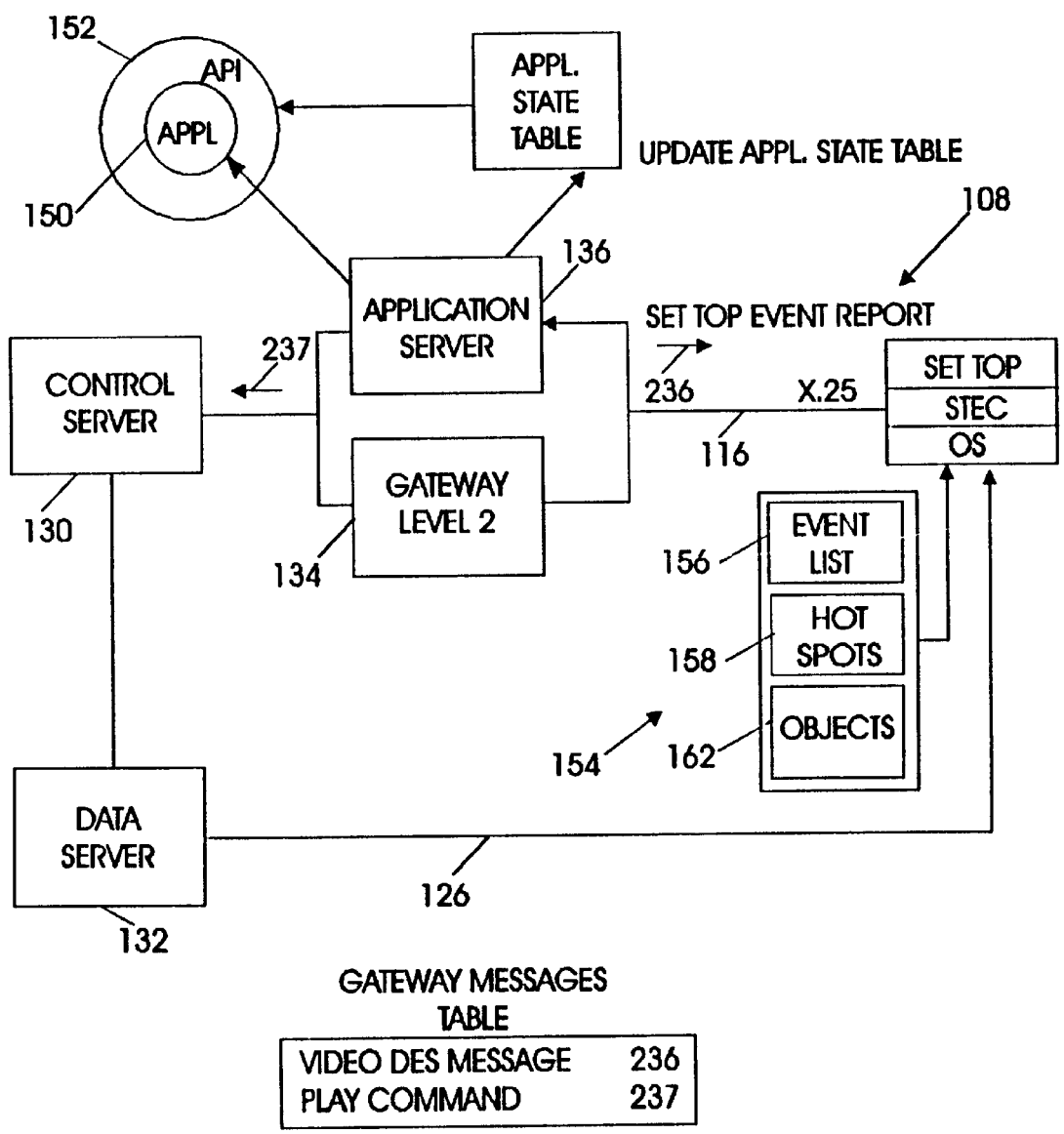

SYSTEM AND METHOD TO PROVIDE INTERACTIVITY FOR A NETWORKED VIDEO SERVER

This application is a continuing application of Ser. No. 08/745,342 filed Nov. 6, 1996 now abandoned.

BACKGROUND OF THE INVENTION

1. Field of the Invention

The invention disclosed broadly relates to interactive telecommunications systems. More particularly, the invention relates to improvements in video servers in providing digital video data on demand.

2. Description of the Prior Art

Many existing video servers provide limited user interaction with a telecommunications system. Such interaction is sufficient for some applications, for example, near video on demand (NVOD) where films and other videos are shown at prearranged times. The interaction is also sufficient where there is a static list of videos from which the user can select. For example, in the server described in U.S. Pat. No. 5,508,732 to J. F. Bottomley et al, issued Apr. 16, 1996 and assigned to the same assignee as that of the present invention and fully incorporated herein by reference, the user is provided with a list of videos and a corresponding four (4) digit code. The user selects a video, which in one form may be a film or movie, for display by dialing the video server, which prompts the user to enter his/her PIN number and a requested video code. This type of interactive application does not work too well for applications that have a changing list of available videos, since the codes cannot be known in advance.

A second problem with video servers in interactive telecommunication system relates to user interaction with the system. Users have had their interaction expectations set by the VCR, and expect services such as video on demand (VOD) to provide play, pause, stop, fast forward, and rewind functions. These functions cannot be accommodated with the existing system.

Other existing implementations of interactivity have taken the approach that the video server is just a remote disk for a Set Top Box (STB) which controls an associated video display terminal. Such an implementation approach has a number of limitations including the fact the set top box is in total control of the application which limits the ability for the server to keep an accounting of user activity. Also, certain interactivity functions are best performed by the server because of either the high cost of performing the function at the STB (e.g., creating a video from data), or because the transmission bandwidth does not allow the function be done at the STB (e.g., picture in picture composition).

U.S. Pat. No. 4,931,950 issued Jun. 5, 1990 discloses a portable multimedia interface for an expert system. The interface operates in parallel with an application program for an expert system. The program is modified to generate multimedia commands which are held in a queue. The commands provide a user with additional information in the form of video and generated speech corresponding to displayed text.

U.S. Pat. No. 4,995,078 issued Feb. 19, 1991 discloses a television broadcast system using land lines for real-time transmission of a viewer-chosen program at a viewer requested time to the requesting viewer's television receiver. The system prevents intelligible viewing of the chosen program on other receivers.

U.S. Pat. No. 4,381,522 issued Apr. 26, 1983 discloses a cable television system which includes a computer system for responding to viewer originated signal selecting a particular television program for viewing. The computer system provides a scheduled video signal which is broadcast over a program schedule channel carrying a video signal representative of television programs to be broadcast. A television signal combiner combines signals from different transmitters for broadcast over a cable to remote receivers. A viewer selects a program by dialing the computer and dialing a number corresponding to a desired program on a schedule made available to the viewers.

None of the prior art discloses an interactive telecommunications system and method which displays on-screen menus at a terminal from a video server and allows users to navigate through a series of menus to select a video or other object for display or interaction with the user at the terminal.

SUMMARY OF THE INVENTION

An object of the invention is a system and method to provide a telecommunications system with a high degree of interactivity to accommodate video on demand, electronic yellow pages, home shopping, and other new applications that users will be demanding in the future.

Another object is an interactive telecommunications system with video servers which support the use of video sequences, graphics, audio sequences, and text in the composition of applications.

Another object is a video server in an interactive telecommunications system which supports functions typically expected with a VCR such as play, pause, fast forward and rewind.

Another object is a telecommunications system which implements interactivity in such a way that minimizes the burden, and hence the cost, placed on a set top box.

Another object is a telecommunications system which implements interactivity in such a way that a server controls and provides good accounting for all user activities.

Another object is a telecommunication system and method which provides a rich environment in a video server to support current and future application requirements, such as database searches, creating videos of database results, sequencing of video from stored archival clips, and composing of picture-in-picture at the server.

These and other objects, features and advantages are accomplished in a telecommunication system providing digital video information on subscriber demand for very large video data files. A gateway is coupled to the system. A control server is coupled to the gateway and to a data server. A controlled server is coupled to the data server and to a data switch. The data server manages a large number of large sized video data files containing video programming data to be broadcast to requesting subscribers over the telecommunications system.

The system executes stored program instructions to provide video information on subscriber demand. The system receives a request at the gateway from a subscriber including his ID and a video ID. The system responds by sending the subscriber ID and video ID to the control server. The control server determine if a subscriber queue exists in the control server for the video ID and is accepting new subscribers. If such is the case, the control server assigns the subscriber ID to the subscriber queue and sends a video confirmation: port ID, and start time to the gateway. The gateway sends the port ID and the subscriber ID to the data switch to connect the port to the subscriber.

If a queue timer for the subscriber queue in the control server has not timed out, the system waits for another subscriber request. If any queue has timed out, the system begins the data server output. The control server receives the video file address and port ID for the subscriber queue and sends them to the data server. The data server loads the first page of video data into an A-buffer and second page of data into a B-buffer from a video storage using the video file address. The system stores a next video store access address. The data server connects the output for the A-B buffers to the port ID. The data server begins outputting the A-buffer to the port ID at the start time, sending a data stream to the data switch. When the A-buffer is empty, the data server begins outputting the B-buffer to the port ID and reloads the A-buffer by accessing the next page of video data from the video store using the next video store accessing address. The data server continues sending A-buffer and B-buffer pages of continuous, serialized video data to the data switch until an end-of-file is detected in the video data. Then, the data server sends a termination message to the control server. The control server forwards the termination message to the gateway. The gateway forwards the termination message to the data switch to release the port connections to the subscribers receiving the broadcast.

One feature of the invention relates to the data server which can consecutively access the same video file in consecutive queue timer intervals corresponding to a plurality of subscriber queues. This feature enables several video feeds of the same video file to be broadcast simultaneously, with their start times staggered.

Another feature enables the system to receive a request in the gateway and automatically perform several functions without subscriber or user prompting, for example, the gateway will respond to such a subscriber request with a voice response unit; receive the subscriber ID and video ID; validate the subscriber ID; access a gateway video catalog using the video ID for voice response data describing the video, and respond to the subscriber with voice response data.

In another feature the system will automatically perform several functions without subscriber function if the subscriber queue timer in a control server has timed out. If no, the subscriber queue exists for the video ID, then the control server will determine if a new port is available. If a new port is available, the control server will create a new subscriber in the subscriber queue in the control server; start a queue timer for adding more subscribers, and schedule the requested video for the port ID at a start time. The control server will assign the subscriber ID to the subscriber queue and send a video confirmation; the port ID, and the start time to the voice response unit in the gateway. The gateway sends the port ID and the subscriber ID to the data switch to connect the port to the subscribers line connected to the telecommunications system. If the queue timer in the control server has not timed out, then the subscriber queue is still accepting more subscribers and the system waits for another subscriber request; otherwise the system begins the data server output.

In another feature subscriber demand controls when the video files are broadcast. A queue timer interval is set to be typically short, so that subscribers never have to wait more than a few minutes for the video to start. Once a first queue timer closes a first subscriber queue timer, the next subscriber is assigned to a new subscriber queue for the next broadcast of the video file which starts after another queue timer interval.

In summary, the present invention provides digital video information on subscriber demand for very large video data files and enables rapid response to video request by systems subscribers, independent of the number of subscribers or the number of video files offered for selection.

DESCRIPTION OF THE DRAWING

These and other objects, features and advantages of the present invention will be more fully appreciated with reference to the following description of a preferred embodiment taken in conjunction with the accompanying figures, in which:

FIG. 11 is a block diagram of messages and message flow in FIG. 5 for a selection off of the panel currently displayed to the set top.

DISCUSSION OF THE PREFERRED EMBODIMENT

Figure 1:
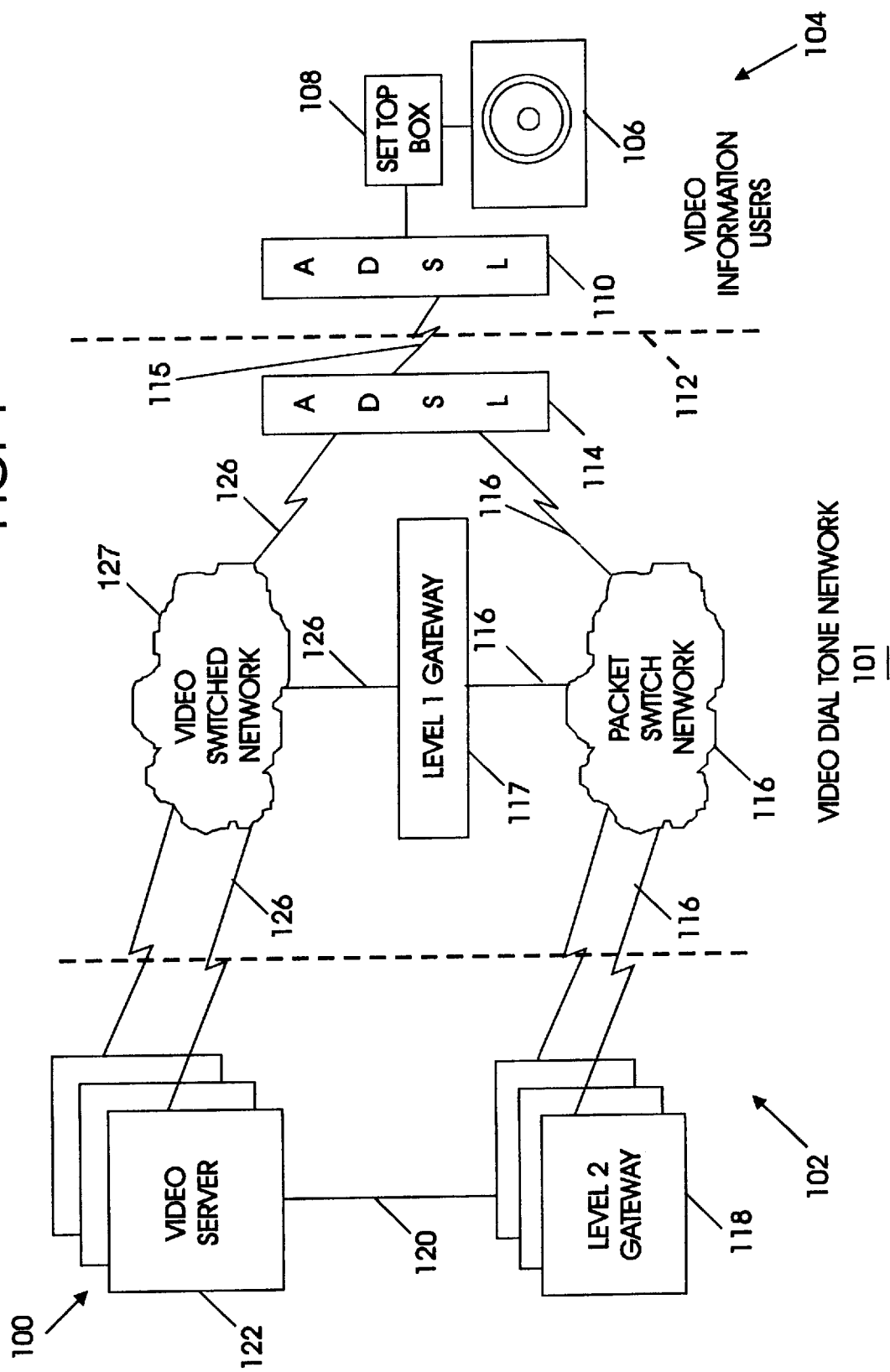
FIG. 1 is a high level functional block diagram of an interactive telecommunication system including a video server coupled to the system through gateways for displaying menus to a plurality of users for selection and viewing of a video or other object in accordance with the principles of the present invention.

Before describing the preferred embodiment, it is believed appropriate to provide some background related to inventive features.

One feature of the invention is an application definition and an execution model which are based on a panel metaphor or concept or self-executing panel objects. An application is simply a collection of panel objects where the flow of the logic is determined by the behavior of each panel object within it. Each panel object is tailored for a set top box at a video display. The panel object is limited to a set top environment which is diskless and has a total RAM storage capacity of 2 MB, of which 1.5 MB is used by the operating system. Thus, with only 0.5 MB left, storing multimedia resources on the set top for an entire application will be impossible and therefore breaking up the application into logical chunks is necessary.

The set top lives from panel to panel and is not aware of the logical connection between panels. A system server processes all requests made from a panel object with no regards to which set top box or which application is involved in such requests. Transitioning from one panel in an application to a panel in another application is treated the same way as if the transition was between panels within an application. This process not only simplifies the processing on the set top box but also supports cross-merchandising, comparative home shopping, or any application suspension/resume in general without having to download entire applications to the set top and shuffle them back and forth. The process also provides flexibility in application development as the application flow can be modified by simply reordering the sequence of panels within that application.

Another feature relates to application definition. A Programming Interface (APIs) provides an application developer access to the current state of a set top box, which is maintained by an application engine. An application may access a table at any time and find out the current state of a set top box. If there are application specific data an application needs to keep track of on a particular set top box, for example, a banking application may want to know the current balance of a person, or the current language preference of a person, and a developer wants to put that in a set top's state table because at any point in time a person can switch language from one to the other. That information can be put in addition to the standard data kept in a set top box date by the application via an API call.

Another feature is database access. A seamless interface to the database is provided without knowing the database language or which type of database is being used for an application to access a billing database, or an account database, or a content database.

Another feature relates to application suspension which allows an application to suspend itself for that set top and then be back to the same position when the application resumes. For example, during the display of a film or movie, a subscriber may initiate a "help" call on the movie application. The suspension feature initiates the "help" application, and when exiting the "help" application, returns to the movie application at the point where the movie was exited, not at the beginning of the movie. When the suspension feature is initiated, the movie application suspends itself, uses the same port to send a register message to the "help" application to take over the set top. When the "help" application ends, it deregisters itself, then the movie application returns and resumes where it left off. A subscriber does not need to go to the main menu and select the movie by going all the way down the selection program. This feature allows suspension of as many applications as possible. Upon suspension, a user can jump to another application, such as home shopping and compare prices by switching back and forth between stores.

Another feature is panel stacking whereby an application can stack the panels, so that a user can back track without knowing where the user was before. For example, in paging forward or paging backward, and a user is paging through page 10 and wants to return to the previous page, the user enter the stack and returns to the previous or any other panel in the stack. The application does not need to keep track of which path the user has been through. The application goes backwards the way that the user transistioned through the panels.

Another feature relates to call backs. Call backs are defined as local behavior on the set top box, behavior that the set top box may go ahead and execute at the receipt of an event before the event is reported to the application. This is done to reduce response time. For example, if a stop button is activated, then a call back for stopping video may be installed on the set top to just go ahead and stop the video without going through the network latency of reporting the stop key being activated and the application issuing a message to stop the video. Call back allows events to happen instantaneously on the set top box and give the appearance of quick response time. There are a number of call backs, for example, disable remote control input, deactivate all hot spots, stopping an audio, etc. which may be implemented Another feature is command list. Command list is a list of operations that an application would like a set top to perform in response to a particular event. The command list can be downloaded to a set top box the same way an event list or a hot spot navigation or panel object description data are down loaded, such that when an event is being hit, the command list simulates commands being sent from the server over the network, but actually the command is retrieved locally from the set top box which provides quick response time without going through the telecommunications system. The command lists are fixed behavior that an application knows that a panel will react to a certain event in a particular way. It is always useful to install command list because it is not dependent on conditions. An event always behaves in a certain manner. For events that are conditioned upon other factors, for example, if you select a watch movie button and it is conditioned on the rating of the movie whether it is rated R, PG, or whatever and your current access level, a command list would not be useful because a trip to the control and a check in the database is necessary. But if user stops a movie and fast forwards, the command list is useful because the fast forward will always happen with a bar and a shut off going through the bar.

Now turning to FIG. 1, a telecommunications system 100 includes a Telephone Company Video Dial Concept 101 in which a video dial tone is provided every time a user turns on a television 106 or turns on a set top box 108 to initiate some sort of interaction with the system 100. The user will not see a fuzzy screen. Instead, a welcome screen or the like shows the user is connected to the system 100. In FIG. 1, the system 100 is divided into several domains, typically three domains: dial tone domain 101; provider domain 102, and household or user domain 104. In the household domain 104, where the subscriber is located, there is the television 106 which is connected by means of the set top box (STB) 108 through a standard interface 110 into the video dial tone network 101. The network 101 is separated from the household video information users domain 104 by the dotted line 112 in FIG. 1. A standard interface 114 in the network 101 is connected to the interface 110 in the household domain by means of a fiber optical link 115, for example, provided by a local telephone or cable company.

In FIG. 1, the interface 114 is connected over a control channel 116 which includes a packet switch network to a level 2 gateway 118 in the video information providers domain 102. The domain 102 is separated from the network 100 by the dotted line 124 in FIG. 1. The control channel 116 is used as a bi-directional communications channel between the household domain 104 and the domain 102, the purpose of which is to establish a two-way conversation for control between the two domains 102 and 104.

In the domain 102, the level 2 gateway 118 is responsible for establishing a session with the set top box 108 and the video information user domain 104. During a video session, a control channel connection as well as the data channel connection with the video server are included in the session. Once these two channels are connected, the level two gateway's job is done because the video session is effective.

The level two gateway 118 is connected by means of the line 120 to the video server 122 and serves to provide control to the video server 122. The video server 122 is connected by means of a broadband network line 126 through a video switch network 127 to the interface 114 in the network domain 101. Video information is served from the video server 122 over the broadband link 126 to the interface 114 and over the fiber optical link 115 to the household interface 110 in the household or users domain 104. Video information is then provided to the set top box 108 for purpose of display on the television 106.

A level one gateway 117 and the network 101 have the following functions. The level one gateway is responsible for accessing the video switch network 127 to actually establish the network on the broadband network. A broadband link is established between a video server port address to a set top box port address upon a request that comes from a level two gateway, the packet switch network 116 and into the gateway level one 117.

Figure 2:
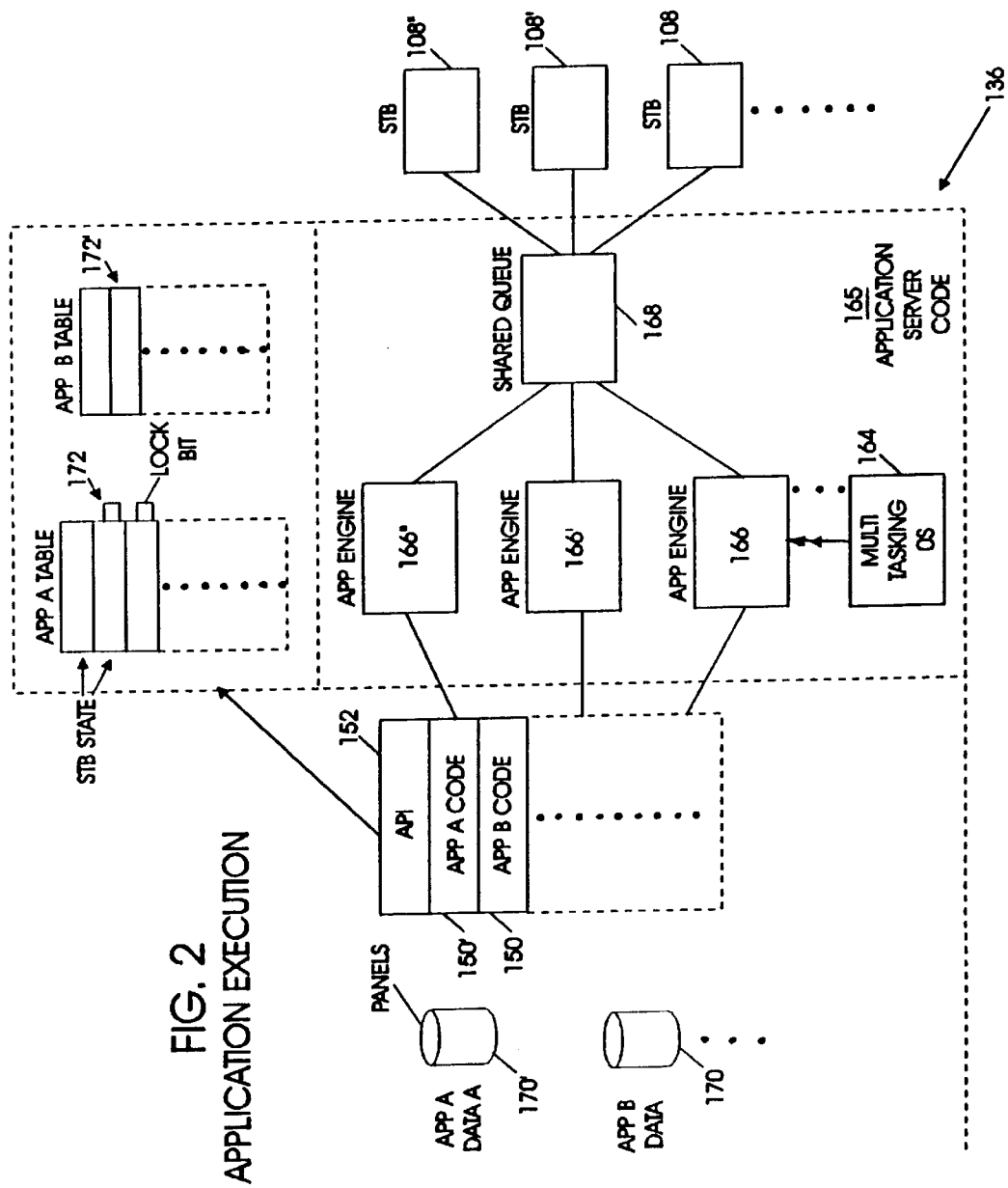
FIG. 2 is a block diagram showing the functional relationships among a plurality of set top boxes and a system application server in executing a system application and defining a system application for the system of FIG. 1.

In FIG. 2, an application environment for the set top box 108 will be described in conjunction with a panel metaphor, which is the definition of an application. An application definition environment will be described first followed by a description of an application execution environment.

In the application definition environment, an application developer defines an application in terms of a panel metaphor. A panel metaphor is a collection of panels or parts of visual displays on the television set. Stated another way, a panel is defined as a collection of multimedia objects plus a collection of data as to how to manipulate those multimedia objects and also a piece of code that describes how to react to each of the events that this panel is interested in when it gets input from the set top box. An application could be a movie application, movie on demand, or it could be a home shopping application, an electronic yellow pages, a banking application, etc. Each application may decide that the visual display for now is panel 1, and then if a user is paging through the same display, an application may decide that panel is the same panel 1, except it has a different variation versus if it goes to another sub-category, then it may call it panel 2. The application developer establishes panel boundaries as a logical definition of the application behavior as a whole. The application developer creates database via an authoring tool to define a panel. The panels are stored in databases 170, 170', 170" etc. depending on how many applications running in the system 100. When the application developer defines the data for the application, the definition data is in terms of an event list, a hot spot navigation map, panel definition, panel object description and all of the video description message going to be used for a particular panel, as will be described in conjunction with FIG. 4. The application developer writes code for each panel for deposit in the application libraries 150, 150', etc. Each of those codes can make calls to the API 152 to determine the behavior at a set top and send commands down to the set top to activate or stop, etc. a display. The code allows access to current application table as updated by the application engine to find out the current state of the set top box for each entry of the set top box table 172. The code can also access a private database such as the content database for what movie is available, for example, or access to a billing database to update the bill or create a bill record, etc. All accessing of tables, databases, etc. is done through API 152 calls. Once code is installed in the application library 150, the application engine simply matches an event ID with the appropriate code and then the code retrieves the appropriate panels to download to the set top, as will be described in conjunction with FIGS. 5–11.

In the execution environment, an application is not set top dedicated and not application dedicated, meaning that any set top from anywhere can run any application going through an application server 136. The application server contains a multi-tasking environment 164, such as OS2 or the like, to activate application engines 166, 166', 166" in executing applications 150', 150" contained in the server and depending on the capacity and the load on system 100. The engine entities 166, 166', 166" have access to the shared queue 168 and take turns accessing the shared queue to retrieve event reports that are forwarded by the set top box 108, 108', 108" and so on. When an event report message is deposited in the shared queue, an application engine 166 will fetch the first message from the queue and look up the application ID, the panel ID and the event ID that is reported in the message by the set top box. Based on the IDs, the engine will update an application table 172, if the application ID in the message is indicated as related to application A. If the ID is related to an application B, the table 172' will be updated, and so on. The tables 172 reflect the current state of the set top box in implementing an application. Depending on the event ID, the application engine will invoke a code segment that accesses the application library 150, 150', etc. to obtain an appropriate code segment that will handle the behavior of the panel for the particular event. When the appropriate code segment is located in the application, an appropriate function will be invoked for the set top box. That function will initiate an API call using an API library 152 to issue commands to the set top and would affect the visual display or audio on the television set. In such instances, any set top that is not reporting an event, but is currently running a video, the application engine will be in a standby condition waiting for that set top to report an event. When an event is reported, the engine will fetch the next event from the shared queue that comes from another set top such as 108' and then serve that set top. If set top 108' takes a long time to process that event, such as a search in a database that may take a long time, and set top 108" reports an event, then another application engine, for example 166 is freed up, can go to the shared queue and pick up that event for 108" and process that event. The server 136 ensures that all of the event reports from any set tops will never stay in the shared queue for more than a millisecond or so, before acted upon. Whether an event report takes a long transaction or a short transaction to process, that event will not impact on the length of the queue, because there will be many application engines to serve the queue.

In the processing of event reports going into the shared queue 168 and being executed by the application engines 166, 166' and 166" and where that event is currently being processed by an application engine, the application codes provide that another event in the same set top which is reported to the server 136 will not be executed by another application engine 166', with conflicting commands sent to the same set top box. To guard against conflicting commands to the set box, the application table 172 includes a lock bit in the set top box state that says that this set top box is being locked for processing by a designated application engine 166. As a result, the shared queue 168 does have the capability of peeking into the table without dequeuing a message. Instead, an application engine accesses the share queue and peeks into the next message, the next event, and then determines if the set top event is being processed by another application engine, in which case the message is left in the queue. Otherwise, the message will be dequeued and removed from the share queue and processed accordingly.

Figure 3:
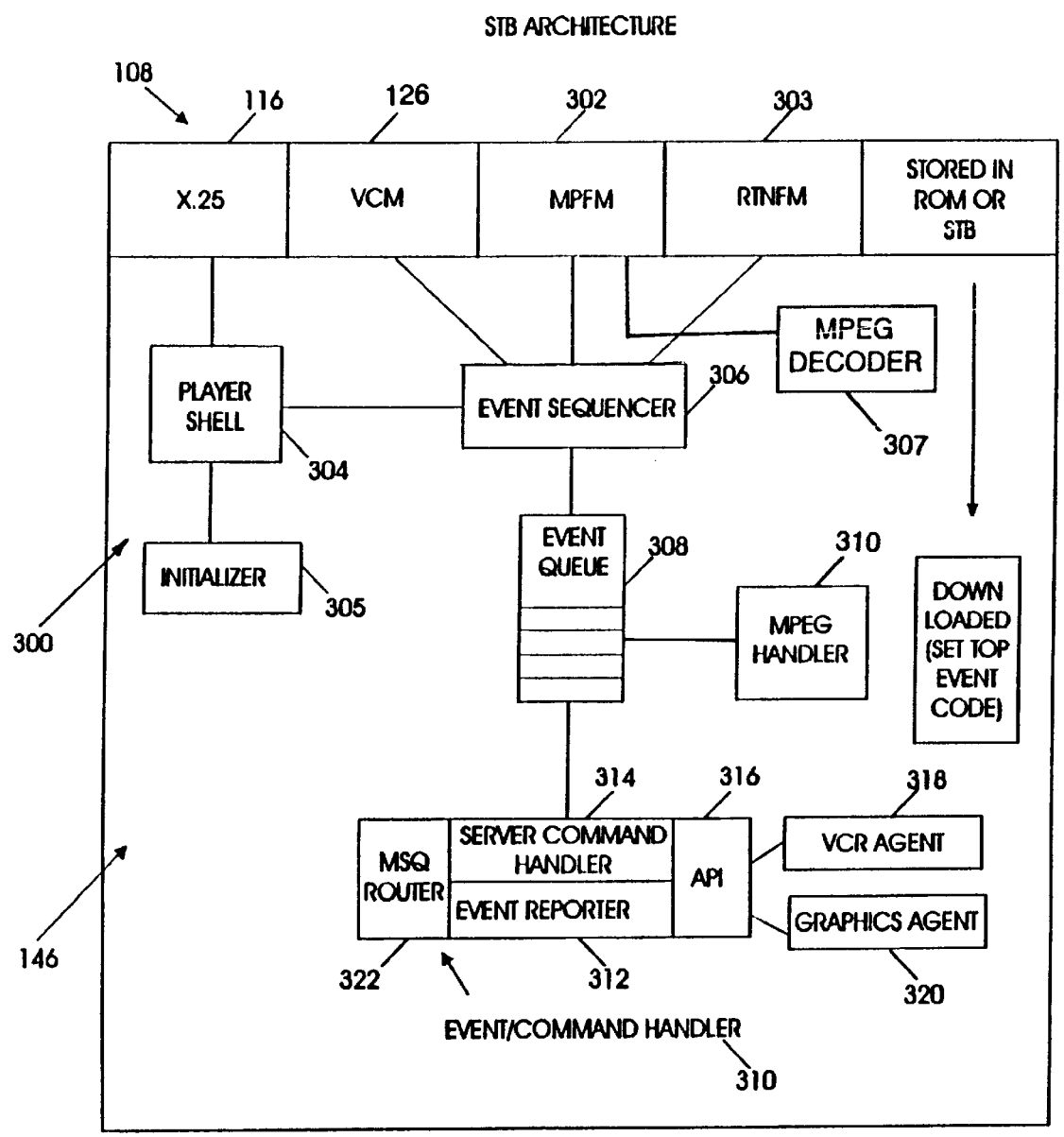
FIG. 3 is a block diagram of software architecture for a set top box in FIG. 1

Turning to FIG. 3, the software architecture will be described for the set top box 108. On the low level, the architecture comprises an operating system 300 and set top enabling code 146. The operating system 300, in one form, may be IBM OS9 software and an OS9 library for Digital Audio Video Interface Devices or OS9 DAVID. The library contains interfaces to the hardware on the set top box. The interfaces include a control channel interface 116, a data channel interface 126, an MPEG or image compression decoding interface 302 coupled to an MPEG decoder 307, and a Real Time Network File Manager (RTNFM) interface 303 which indicates when that has been received on the data link. On top of the DAVID library, a player shell 304 is linked to the interface 116, an initializer 305 and an event sequencer 306. The player shell's function is to boot the set top code 146 when the set top is powered on by the initializer 305. The player shell retrieves from local storage (not shown) and provides the TV 106 (See FIG. 1) with a bitmap which usually displays "Welcome To Video On Demand" or the like. The software interfaces and player shell are stored in local memory such as a ROM 307.

The set top enabling code 146, on the low level, contains an event sequencer 306 which has the responsibility to capture interrupt messages or signals from the various DAVID components, such as the control channel interface, or the MPEG decoder interface 302 or the data channel interface 126. Such signals indicate that an event is coming into the set top box as a hardware event. The event sequencer 306 places the events in order of priority into an event queue 308. The event queue is an entity in a shared memory (not shown) that is accessed by an event/command handler 310 which comprises an event reporter 312 and a server command handler 314. The handler 314 only executes events from the event queue which are commands from an application server 136 (See FIG. 4), as will be described hereinafter. The event reporter executes events from the queue and reports back to the server 136 via an event report message, as will be described hereinafter. Summarizing, if an event is a remote control event, then this will be processed by the event reporter 312. If the event is a message coming over the control channel interface from the application server, then it is handled by the server command handler 314. Both the event reporter 312 and server command handler 314 make use of API calls 316 which access a VCR agent 318 and a graphics agent 320. The VCR agent executes any API commands locally on the set top that has to do with video manipulation, such as stopping a video, freezing a video frame, fast forwarding, rewinding, etc. The graphics agent handles any API calls which pertain to the graphics display on the screen, such as drawing a square box to highlight the buttons, or displaying a bitmap or tearing down a bitmap, overlaying a bitmap, etc. The event reporter uses a message router 322 to send messages to the event queue 308 for the event sequencer 306 to send message back to the application server 136 (See FIG. 2) through the control channel interface.

Figure 4:
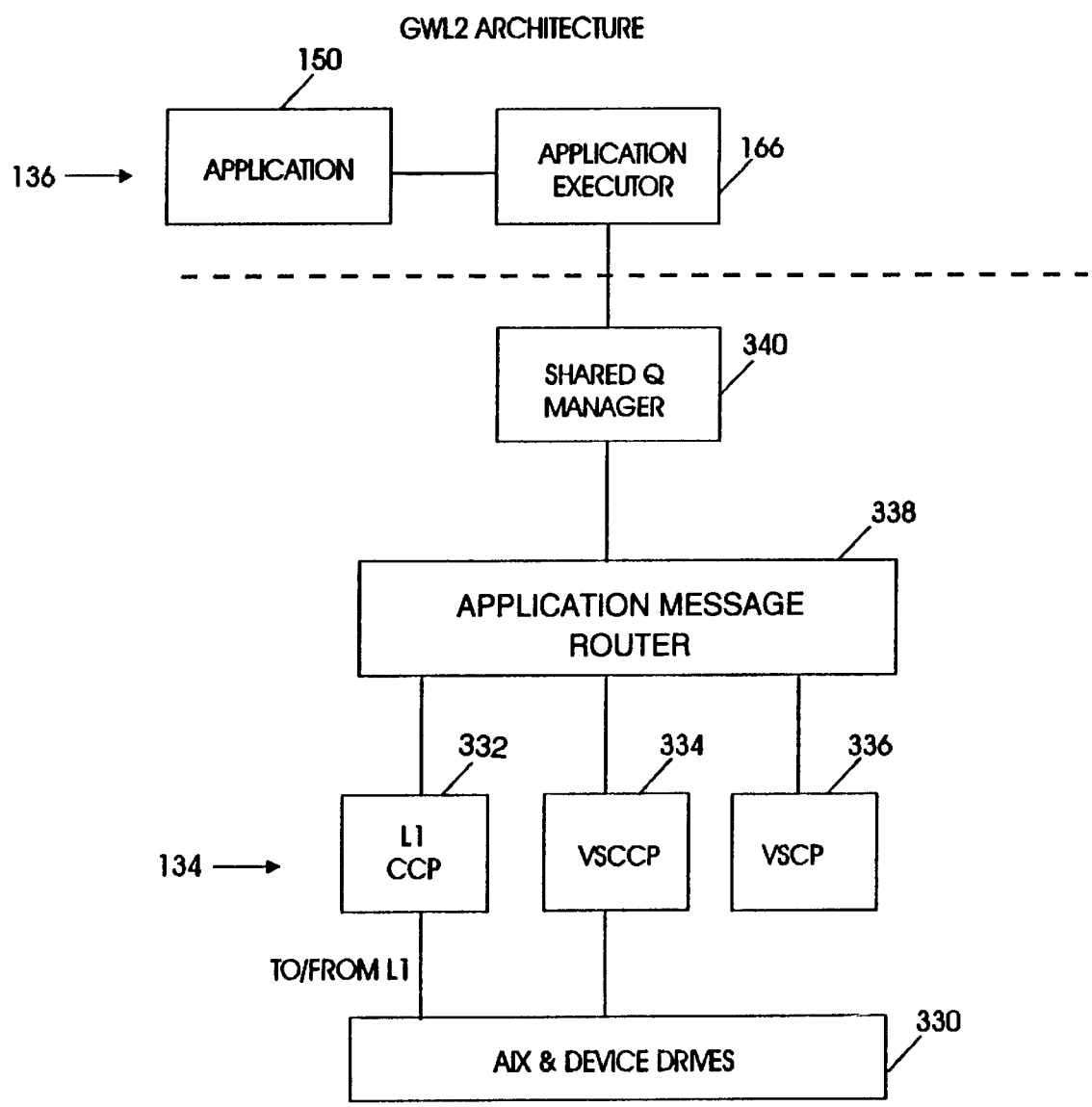
FIG. 4 is a block diagram of software architecture for a level 2 gateway in FIG. 1.

In FIG. 4, the software architecture will be described for the level 2 gateway 118 shown in FIG. 1. On a first or low level, the gateway 118 includes an operating system 330, such as the IBM AIX operating system and device drivers for various interface to the network 101. On a second or higher level, the gateway 118 comprises a level one connection control part (LICCP) 332; a video session connection control part (VSCCP) 334 and a video session control part (VSCP) 336. The LICCP 332 handles all conversations and protocols with the level 1 gateway 117 in FIG. 1 for the video dial tone network protocol. The VSCCP 334 handles all of the incoming and outgoing messages to the set top box through the control channel 116. The VSCP 336 interprets messages received by the L1CCP and VSCCP in the context of setting up a video session, which includes the connection of a data channel as well as a control channel. The VSCP 336 also controls where the set top box will be connected next, as soon as the video session control is established, and how to handle error when the video session control fails which is executed in the gateway 134. On a third level, an application message router 338 is a library which allows the LICCP 332, the VSCCP 334, the VSCP 336 and an application (to be described hereinafter) on the gateway 118 to talk to one another. On a fourth level, a shared queue manager 340 manages a share queue 168 (See FIG. 2) in a shared memory (not shown). The share queue manager manages the size of message data in the queue or destroying messages in the queue. Any message received by the gateway 118 is deposited in the share queue by the share queue manager. Any message forwarded from the VSCCP 334 through the control channel 116 is passed on to the share queue manager through the AMR 338 and deposited in the share queue. All application servers 136 (to be described hereinafter) have access to the share queue. The share queue manager's 340 function is to put incoming messages in the share queue, such as event reports from the VSCCP that receives messages from the set top. The messages are processed by an application executor or engine 166 (part of the application server 136) which has access to the shared queue. The server also contains a series of applications 150 which are executed in the server and implement the features of the invention.

Figure 5:
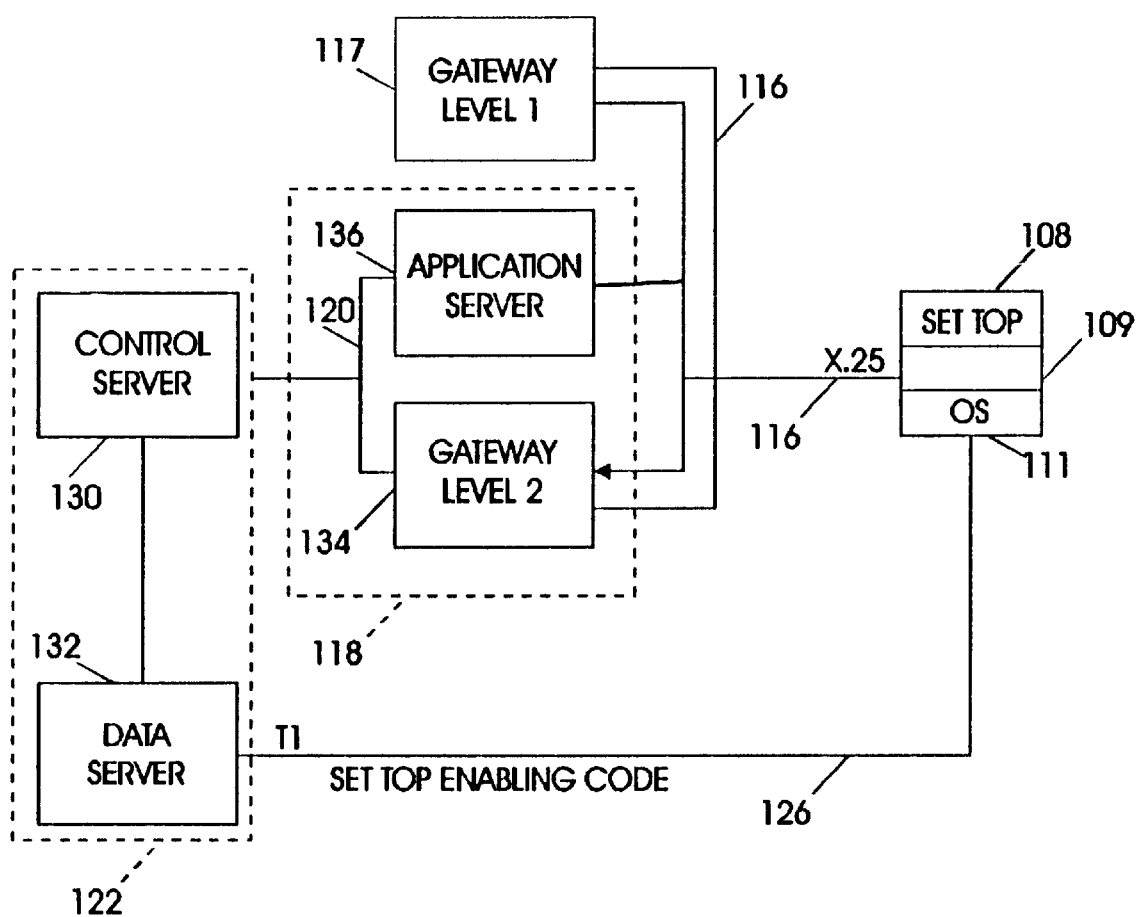
FIG. 5 is a block diagram of the logical interconnection of the functional units in the system shown in FIG. 1.

FIG. 5 shows the logical interconnection of the elements in the system 100 described in FIG. 1. In FIG. 5, the video server 122 is made up of a control server 130 and a data server 132. The control server 130 and the data server 132 are described in greater detail in the above-cited U.S. Pat. No. 5,508,732.

In FIG. 5, the set top box 108 includes the operating system (OS9) logically connected over the control channel 116 to the level two gateway 118. The level two gateway 118 is divided into the gateway level two 134 and the application server 136.

Also shown in FIG. 5 is the gateway level one 117 which is connected by means of the line 116 through the packet switch network to the level two gateway 118 and, in particular, to the application server 136 in the gateway level two 134.

The network line 126 connecting the set top box 108 to the data server 132 and the video server 122 is a T1 line, for example, which supports a 1.5 megabit per second data rate. The set top box 108 is connected to the television 106 (See FIG. 1) on the logical level. The set top box 108 comprises set top enabling code 109, part of the player shell and the operating system 300. As described in FIG. 4, the gateway level two 118 comprises two logical components, one logical component being the level 2 gateway 134 and the other component being the application server 136. The purpose of the gateway 134 is to establish a video session between the set top box 108 and the video information provider domain 102. And again, the video session is the successful connection of a control channel 116 and a data channel 126. The purpose of the application server 136 is to use the video session to deliver whatever application 150 (See FIG. 2) is selected by a viewer. The server 136 controls the logical flow of the application and the interactivity between the set top box and an application in the server 136. The video server 122 comprises two logical components. One component is a control server 130 and the other component is a data server 132. The control server is responsible for accessing the data server 132 and play or stop the delivery of video data to the set top box. The server 132 receives commands from the gateway 118 to do such. The data server 132 receives command to play or stop data delivery from the control server 130 and is responsible for finding in an attached storage (not shown) an appropriate file that represents the video data and delivering the file to an appropriate server port at a specified rate to the set top box via the connection link 126.

Figure 6:
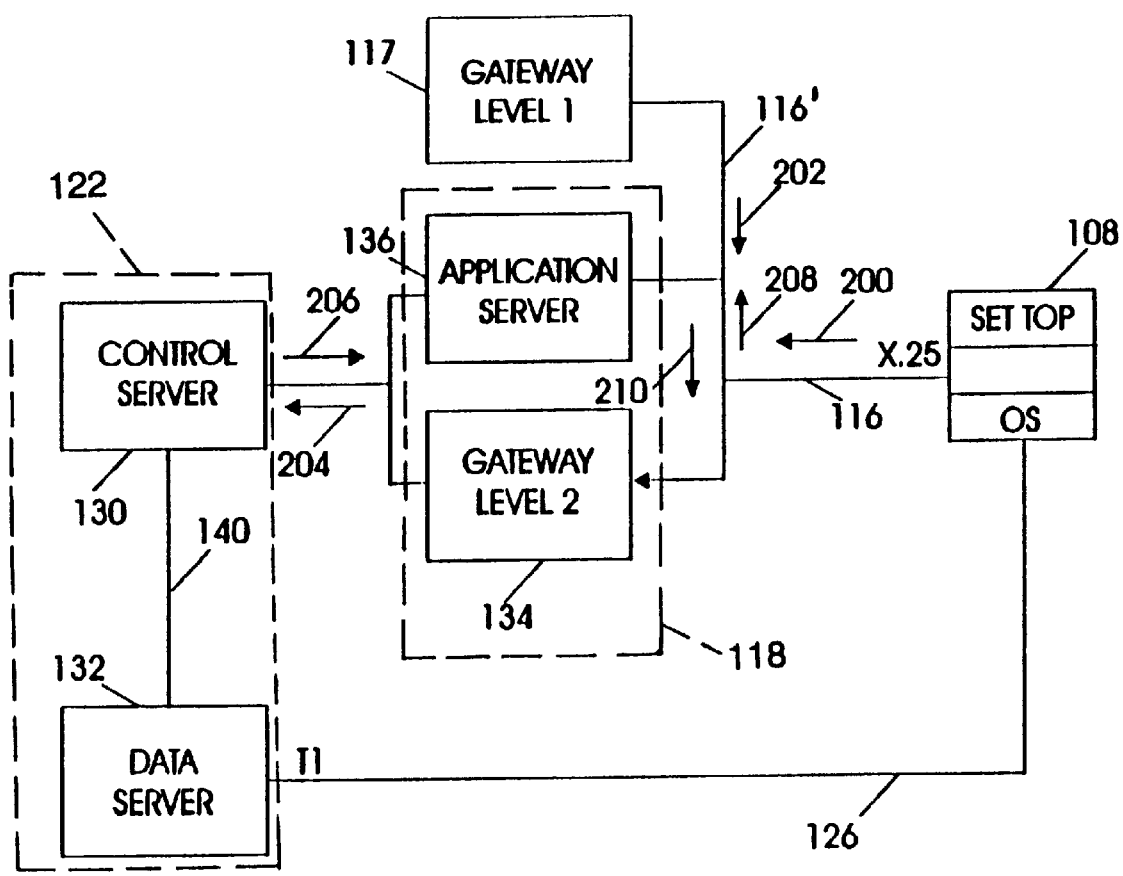
FIG. 6 is a block diagram of messages and message flow in FIG. 5 for establishment of a connection between a user and the system to initiate a video-on-demand session.

FIG. 6 describes the process for connection establishment between the set top and the system 100. The entry to FIG. 6 occurs when the user powers on his/her set top box 108 at home. Upon the powering on, a connection will be made from the set top box to the gateway level one 117 via the connection link 116, after a video dial tone is provided by the network 101 (See FIG. 1). Upon receipt of an event of the set top being powered on, the level one gateway 117 will download to the TV display a list of video information providers in domain 102 for the viewer to choose a provider for service through the connection link 116 to the set top. The set top with user input will then make the selection of the appropriate video information provider. Level 1 Gateway 117 sends a message to the gateway 118 via connection link 116' indicating the video information provider selected by the set top. The receiving component is gateway level two proper 134. Upon receipt of the message introducing the set top to the information provider, the gateway 134 requests the control server 130 for an available port which is free on the data server 132. The control server provides the gateway 118 with the available port address. Gateway 134 then provides that port address back to the gateway 117 and requests the gateway 117 to make the connection on the video switch network 127 between the port on the data server 132 and the set top address 108.

A brief description will now be provided for the different messages exchanged between the different logical components described in FIG. 6. A more detailed description of message content and format is provided in Appendix 1 entitled "Application Message Specification", which is believed self-explanatory.

A first message designated a "hello" message 200 indicates the set top box is powered on via connection link 116 to gateway 117. An "introduce" message 202 from gateway level one 117 to gateway 134 identifies the set top initiating a program request. A "port request message" 204 from the gateway 134 to the control server to provides the set top with an available port on data server 132 will be called port request message 204. A "port reply message" 206 from the control server provides an available port address to the gateway 134. A "video connection request" message 208 from the gateway 134 provides that port address to the gateway 117 and requests gateway 117 to establish a video session using that port and the port address of the set top. From then on the gateway 117 will reply back to the gateway 134 indicating success of a video connection with a "video connection acknowledgement" message 210.

Upon receipt of the message 210 from gateway 117, the gateway 134 will try to establish a control channel connection to the set top box 108 via connection link 116. Upon successful connection of the video link, the gateway 117 will sever its connection 116 to the set top, thus freeing up the set top to receive a call from gateway 134. Once the control channel is established between gateway 134 and set top 108 and the video connection is already established as indicated by a successful return from message 210, the video session is enabled which ends the connection establishment software flow of FIG. 6.

Figure 7:
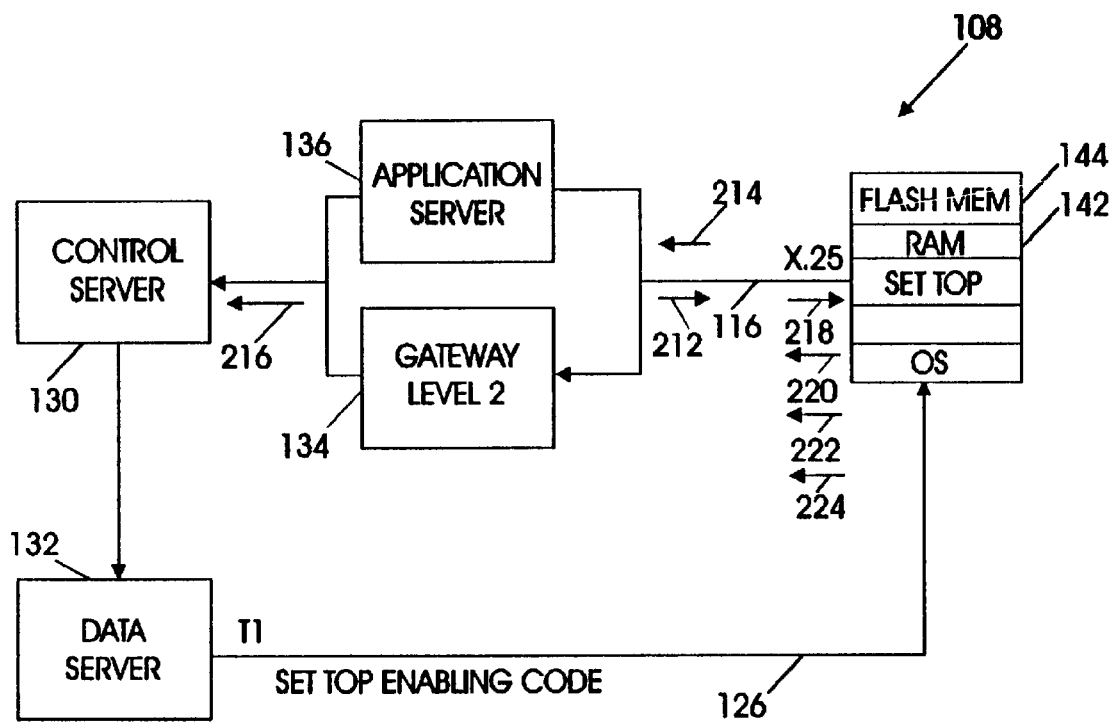
FIG. 7 is a block diagram of messages and message flow in FIG. 5 for down loading enabling code from the system to a set top box for controlling video-on-demand sessions at a user display terminal.

FIG. 7 describes the process of downloading the set top enabling code from the data server 132 to the set top 108. The down loading will be dependent on a successful connection establishment, described in FIG. 5. The set top box 108 is comprised of an operating system that is loaded in a flash memory 144 and has random access memory 142 available to receive the set top enabling code. The gateway 134 having successfully established a control channel connection 116 to set top box 108 as described in FIG. 6 then proceeds to send the set top 108 a "flash update" message 212. The message 212 is sent in the event that the version of the set top code as recorded in its global address at the control server 130 indicates the operating system in flash memory 144 is at a down level. The message 212 tells the set top that a flash update will occur and to get the set top box ready to receive the update. The set top, if a flash update is needed, will send back a "ready" message 214. The gateway 134 sends a "download" message 216 to the control server 130 to download the new operating system to be loaded in flash memory 144. The control server issues the message 216 to the data server 132 to download the particular file via connection 126 to the set top 108. The set top activates a process of updating the flash memory and in so doing, turn itself off. After the flash memory is updated, the user is instructed to power on the set top, as described in FIG. 5.

The second time the set top is activated, the operating system is updated to the proper level. Therefore, the message 212 will not occur. A "boot size" message 218 from the server 130 tells the set top via connection 116 to get ready to receive a file which represents the size of the set top enabling code. The set top replies with a "ready message" 220. The gateway 134 issues a "download command message" 221 to the control server to download the set top enabling code. The control server 130 through the data server 132, download the appropriate file to the set top. The set top, upon receiving the file, issues a "download done message" 222 to the gateway 134 and activates the set top enabling code. Upon coming up for the first time, the set top enabling code will send a "set top box ready message" 224 to the gateway 134 and this will end the process downloading the set top enabling code download.

Figure 8:
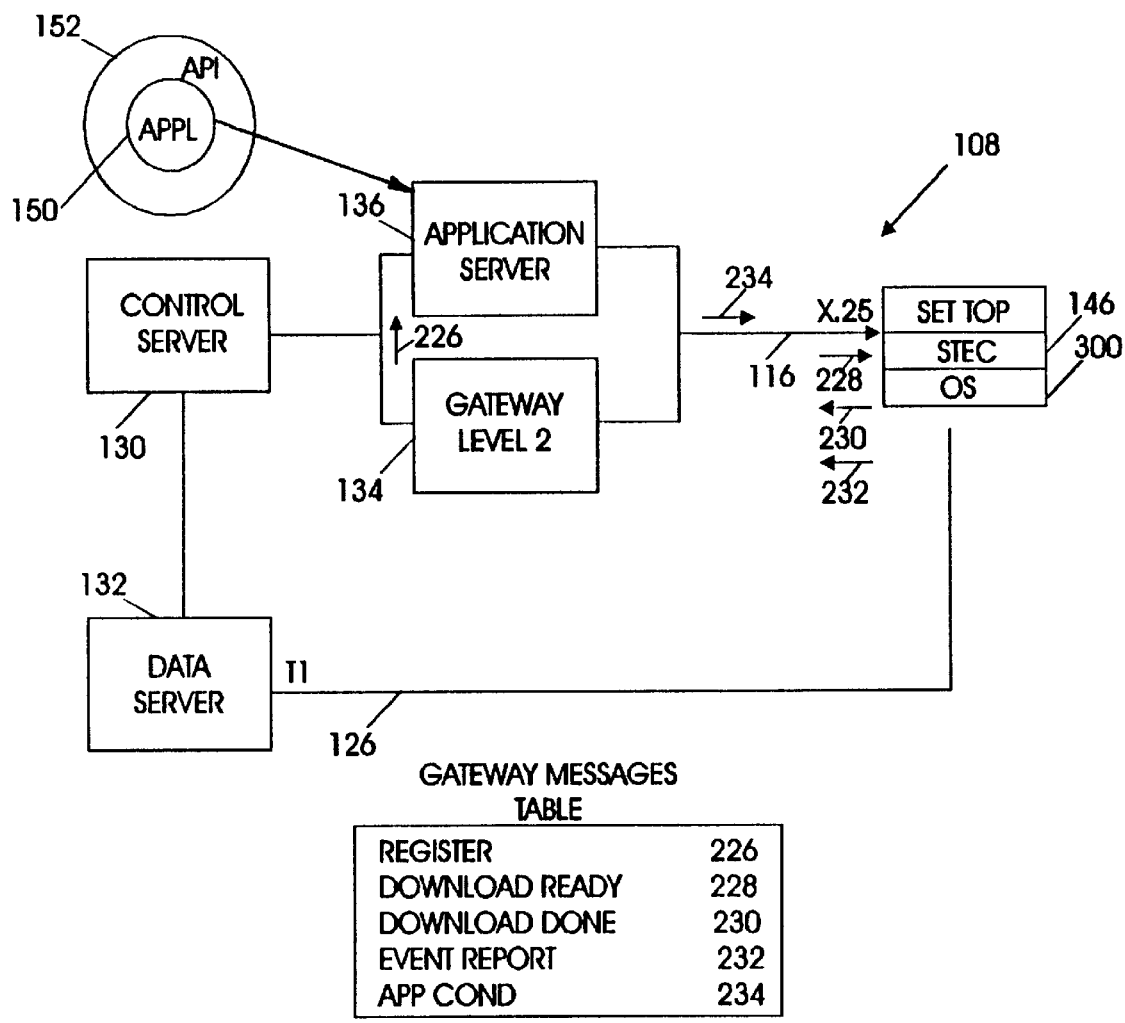
FIG. 8 is a block diagram of messages and message flow in FIG. 5 for down loading a display panel related to a system application for response by a set top box in initiating a video-on-demand session.

FIG. 8 describes the process for the downloading of application panels to the set top box 108. Before describing FIG. 8 the status of the system will be reviewed. The set top box 108 contains the set top enabling code 146 and its operating system updated in flash memory 144 (See FIG. 7). The set top enabling code receive command messages from the application server 136 and makes calls to the operating system 300 to display or clear or whatever is needed to affect the visual display on the television set. The set top enabling code 146 also reports any event that is reported by the operating system as the result of a remote control input or an event in the video MPEG decoder or an event in the connection line 116. The gateway 134 receives STB event reports via connection link 116 and forward them directly to the application server 136. The server 136 contains application code 150 as developed by a video information provider, such as Blockbuster or Disney or others. The application code makes use of a set of application programming interfaces 152 to issue commands needed to take effect down at the set top box on the television set. The application program 150 and the application program interface 152 exist as program code which exist as a sequence of executable instructions stored in an engine or processor 166 (See FIG. 2) within the application server 136 and which when executed by that processor, carries out the functions intended for the application code 150 through the application program interface 152. Each application 150 is a collection of panels, each panel being a logical transaction as defined by the visual display on the set top box.

Figure 9:
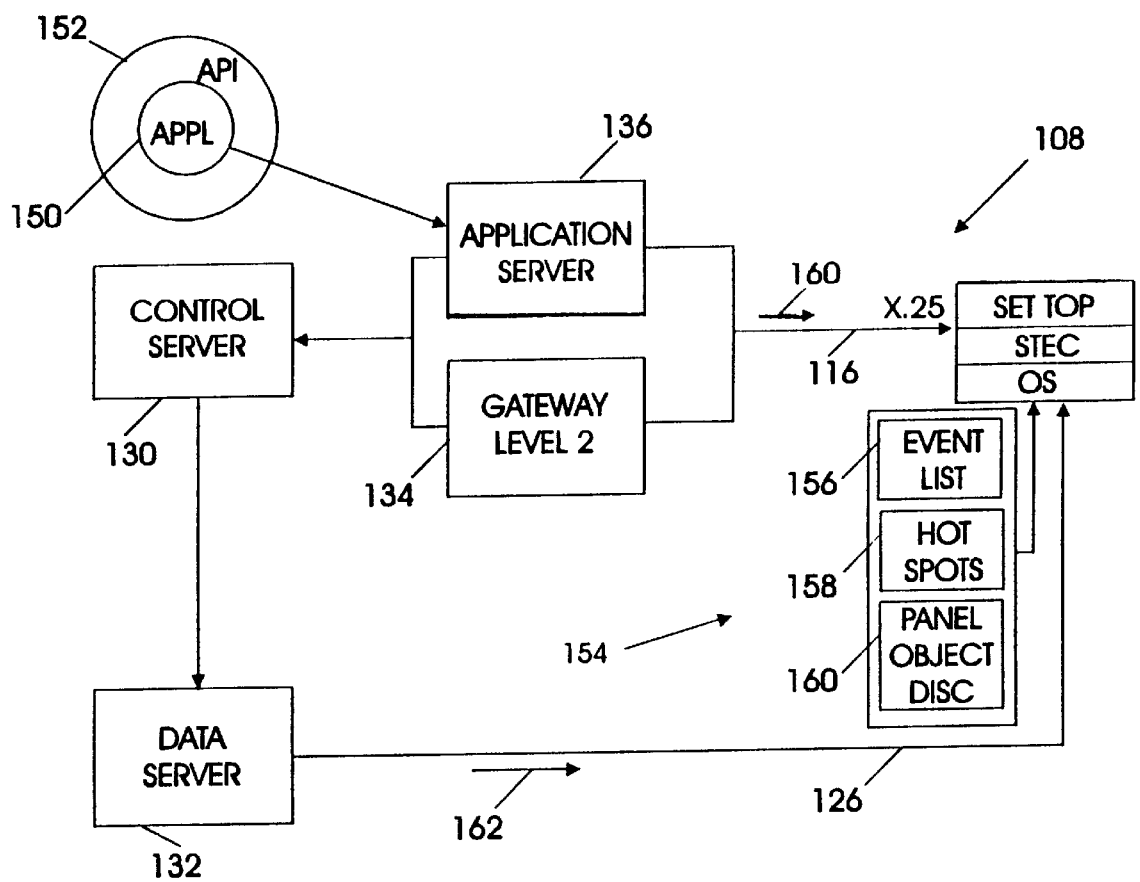
FIG. 9 is a block diagram of messages and message flow in FIG. 5 for down loading from the system application a panel definition defining the events, hot spots and panel objects to be transferred to the set top box in executing a video-on-demand session.

Turning to FIG. 8 a process will be described for sending the first panel definition down to the set top box. Upon successfully receiving the set top box "ready message" 224 as described in FIG. 7, the gateway 134 sends a "register message" 226 to the first application that needs to be downloaded to the set top. Generally, the first application is a personal identification number (PIN) validation application. For example, in this case, considering that the PIN validation application is the first application, the message 226 will cause the first application to download via the connection link 116 a panel definition data 154 to the set top enabling code as shown in FIG. 9. The data 154 downloaded to the set top enabling code 146 will comprise an event list 156 which tells the set top to report certain events in which the panel is interested. The data 154 also contains a hot spot map 158 which describes the area on the television set where a selection may be made and usually corresponds to a button on a background bitmap to be displayed on the television set. Along with the data 154 is a description of the various multimedia objects 160 which will be downloaded later on to the set top. The data 154 serves as a warning to the set top that the downloaded panels will come in a specific size for the set top to perform a check sum to ensure the integrity of the data. Returning to FIG. 8, upon receiving the data 154, the set top enabling code 146 sends a "download request message" 228 to the application server 136 which issues a "download command" 216, as described in FIG. 7, to the control server. The data server 132 is activated to download the multimedia objects required by this panel through the data channel 126. Upon receiving the data download through connection link 126, the set top performs a check sum against the panel definition data 154 received earlier. If the check sum is correct the set top will send a "download done message" 230 to the server 136. Upon receiving the "download done message" 230, the server issues commands to the set top 108 to display the first panel. Such commands will be for example, display bitmap, play the audio, turn on the hot spots, which is usually a frame or square around the button to be selected by the user. The set top at this point is ready for a user selection as the background bitmap has already been displayed, the hot spot has been already displayed around the button to be selected. The set top receive a remote control input from the user based on the event list that was downloaded earlier through the panel definition data. The remote control input will be reported to the application server 136 through connection link 116 via an "event report message" 232. Upon receiving the message 232, the application server will translate the event into a selection that is a selection event and transition to the next panel. The next panel sends panel definition data 154 to the set top code 146 in the set top box 108. If a panel transition needs to occur, the clearing of the previous panel also occurs which is handled by the application server 136. Commands are issued by the server to the set top enabling code, for example, to clear the bitmap, stop the audio, turn off the hot spots, etc.

All commands issued by the application go through the connection link 116 under the form of an "application command label message" 234. Such commands display or clear a bitmap or play an audio or activate a hot spot. The commands 234 are issued by the application program 150 executing in the application server 136.

Returning to FIG. 9 a process is described for downloading objects from an application to the set top 108. Objects have been briefly described in FIG. 8. in connection with the receipt of the panel definition data 154 by the set top code. To send objects the server 136 issues a "download command message" 216, described in FIG. 7, to the control server for the application to play or download a file through the data channel 126 to the set top box. If the object filed is a panel object, the set top compares the file receive with the panel object description data received earlier to ensure the data is wholesome. The objects 162 returned to the set top are stored in the set top random access memory 142, along with the panel definition data such as the event list 156, the hot spot map 158 and the panel object description 160.

The panel definition data 154 is comprised of an event list 156 which is a description of a list of events that the particular panel is interested in capturing on the set top, such as certain remote control keys, like the numeric keys or the VCR keys or just the stop keys. Whichever key the panel is interested in receiving will be enabled through the event list. VCR keys or remote control keys that are not included in the event list will not be reported to the application server and therefore will have no effect on the panel. A second panel item is a hot spot map 158, which is the description of which area on the television screen and therefore on the background panel bitmap is selectable, i.e., it will be highlighted by a halo that will go from button to button as the set top moves the cursor keys on the remote control. The hot spot map also contain a hot spot navigation map which tells the relationship between one button to another as the users selects a right arrow key or a left arrow key or up key or down key, which button will be the next button as a reference point to the current highlighted button. A third item on the panel definition data 154 is a panel object description 160 which describes all of the panel objects to be downloaded later through the panel object file. Such files may comprise one or two or three bitmaps, or two audio files, whichever makes the panel visible or alive to the user. The panel object description item 160 also describe panel objects to be downloaded to the set top. The objects will indicate all the multimedia files in the panel object. Such multimedia files can be, for example, of a type bitmap which is of a BMP format or an audio file which is of a wave format. The panel object description also provides the size of each file and what is the sequence of concatenation that file is in relation to the whole panel object file. The description also tells the set top where to store these files into RAM memory 142 in the set top, so the files can be easily referred to by the application.

Figure 10:
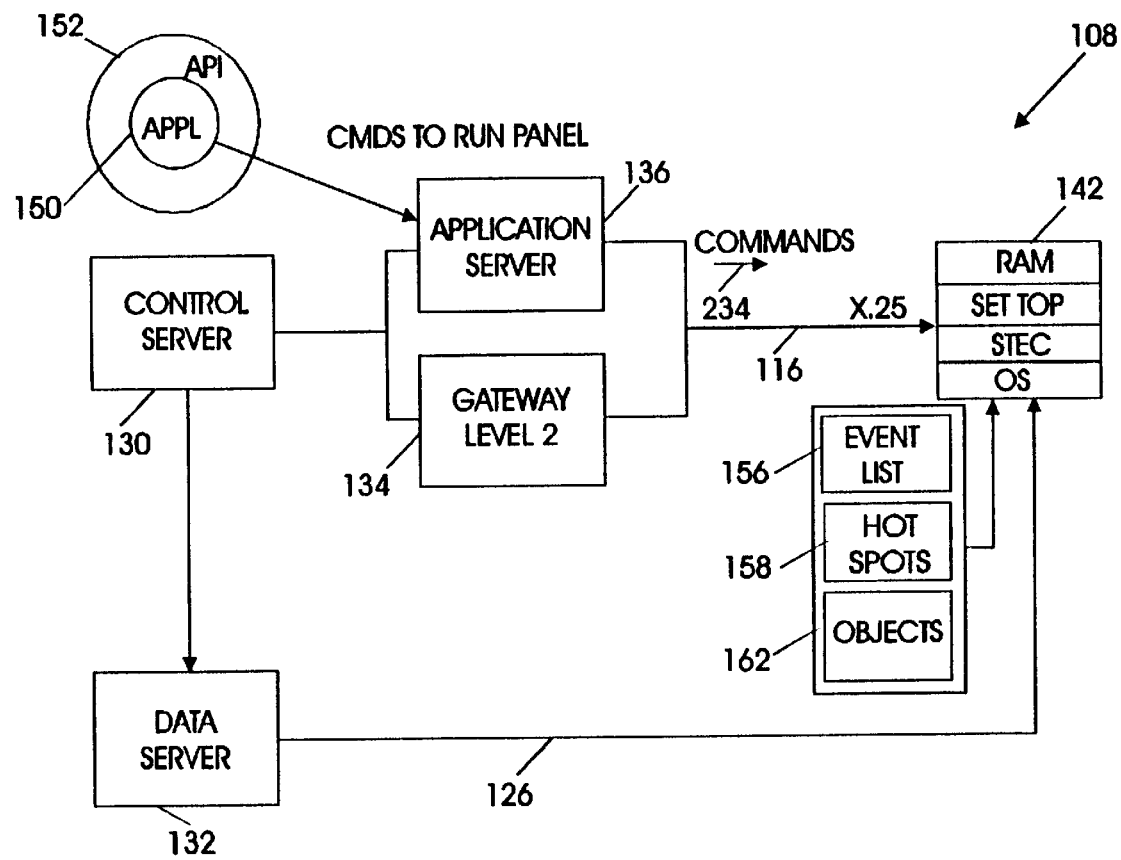
FIG. 10 is a block diagram of messages and message flow in FIG. 5 for running a panel after the set top has received the panel object file in memory.

FIG. 10 describes a process for running a panel after the set top has received the panel object file in memory. The set top sends a "download done message" 230, described in FIG. 7 to the application server. The server issues a series of APIs 152 to command the set top to manipulate downloaded panel objects. Such manipulation includes clearing, activating, displaying, scaling down, etc. the panel objects. The commands are sent to the set top via link 116 in "application command messages" 234.

FIG. 11 describes a process for a selection off of the panel currently displayed to the set top. The process occurs as soon as the set top executed all of the commands to manipulate the panel objects downloaded as specified by the application. Once the hot spot has been activated via a command, the set top viewer is essentially ready to make a selection and via the navigational keys, up arrow, down arrow, left arrow, right arrow on the remote control. The set top enabling code moves the highlight halo from button to button according to the hot spot map 158 downloaded earlier. At the press of a remote control key (not shown), the set top enabling code verifies the existence of such event in the event list 156 to determine whether the key that is of interest to the panel. If such is the case the event is sent to the application via an "event report message" 232 described in FIG. 8. Upon receiving the set top event reported by the set top enabling code, the application decides whether the event results in the transition to another panel are sent. If such is the case, the commands to clear the panel via API set 152, described in FIG. 9. The application sends deactivation command or clear command to the set top to tear down the current panel and transition to a new one. As soon as the set top has received these commands, the application starts a new panel which goes back to the process described in FIG. 8, sending the panel definition data for the transition panel.

Continuing in FIG. 11, the application server 136 receives an event report from the set top as a result of the selection of a panel display on the television screen. Upon receipt of such event, the application may transition to another panel, but may also play a video file and not transition to the next panel. Such instance would be the selection of a movie title on a page panel for the movie to be played. When this occurs, the application translates the event into a movie selection and issues a "download command message" 216 to the control server, described in FIG. 7, to play the file representing the video or the movie through the data channel 126. By issuing the command, the control server first queues the file onto the port on the data server 132 but does not play the file. The application also sends a "video object description message" 236 to the set top. Upon receipt of such message, the set top prepares the MPEG decoder 302 (See FIG. 3) to receive the video described in that message, namely the packet ID for audio and the video compressed in the file. Upon receiving a MPEG decoder ready indication, the set top sends a "download request message" 228, described in FIG. 5, for the application to download the video file described earlier in the "video description message" 236. The application server issues a "play command message" 237 to the control server which opens the queue to the port connected to the set top on data server 132 to play the video file currently queued over connection line 126.

It is at this moment that the video playback on the television occurs. The "video description message" 236 contains the duration of the video being played as well as a play allowance and a pause allowance for the set top to process. Essentially, a play allowance is the total number of time in milliseconds that the viewer is allowed to play forward in normal speed of a video file. The purpose of the play allowance is to prevent the user from viewing the end of the movie and rewinding to the beginning and viewing the movie a second time. Essentially, the play allowance comprises the duration of the movie plus a percent of the movie run time for the viewer to rewind the movie. For example, if you want the viewer to rewind up to 30 percent of the movie and the movie is three hours, a play allowance of four hours is provided. Therefore, the viewer can only rewind back an hour. The play allowance also allows the viewer to choose when the movie should be rewound. The viewer has one hour to budget rewinding activity. The viewer does need to watch to the end of the movie and rewind an hour. The viewer can watch in the middle of the movie, rewind 15 minutes, watch another half hour, and rewind another 15 minutes. As long as the viewer uses four times 15 minutes, the viewer has exceeded their play allowance and are required to watch the movie in normal speed until the end to avoid a penalty for overtime.

In addition to the play allowance data in the "video description message" 236, there is also a pause allowance data, which is the time in milliseconds that the viewer is allowed to pause in a running video. The pause allowance prevents the viewer from pausing indefinitely and tying up the port dedicated to the set top, to the detriment of other users.

Although a specific embodiment of the invention has been disclosed, it will be understood by those having skill in the art that changes can be made to that specific embodiment without departing from the spirit and the scope of the invention.

What is claimed is:

1. An interactive television network comprising:

a set top box in a user location;

an application server in the network coupled to the set top box;

a video server coupled to the application server and coupled over a high speed communications link to the set top box;

database means coupled to the application server for storing applications as panels;

application libraries coupled to the application server for storing commands related to the panels;

the application server including a shared queue coupled to a plurality of set top boxes for exchanging commands governing the behavior of the panels which control video data communicated from the video server to the set top box; and a plurality of set top boxes serviced by a plurality of video applications on a time shared basis using the shared queue, the set top boxes comprising an event handler coupled to an event queue; a vcr agent and a graphics agent.

2. An interactive video system comprising:

a) a set top box coupled to a display terminal and a first interface;

b) a video dial tone network including a control channel and a data channel coupled through a second interface to the first interface;

c) a first gateway coupled to the control channel;

d) a video server coupled to the first gateway and to the data channel;

e) a second gateway coupled to the control channel and the data channel, the second gateway including an application server including a shared queue coupled to a plurality of set top boxes, the set top boxes including an event handler coupled to an event queue; vcr agent and a graphics agent;

f) database means coupled to the application server for storing applications as panels expressed as an event list, a hot spot navigation map, and panel object description;

g) application libraries for providing commands related to the behavior of a panel provided to the set top box by the application server; and h) table means responsive to the application server for indicating the operating state of the set top box.

3. In an interactive video system for controlling interactive video-on demand files in a server through a video dial tone network and set top boxes to a plurality of subscribers, a method comprising the steps of:
   a) activating a set top box coupled to a display terminal and a first interface for a video session;
   b) coupling the video dial tone network to the first interface through a control channel;
   c) coupling a first gateway to the control channel and the video server to establish the video session between the interactive video on demand files and a subscriber;
   d) storing an application as panels expressed as data in a database where the data defines an event list, hot spot navigation map and panel object description; and
   e) activating an application server and application libraries to interact with the database and the video server to deliver over the data channel the application selected by a subscriber in a panel for viewing a video on demand file on the display through the set top box, the set boxes comrising an event handler coupled to an event queue; avcr agent and a graphics agent.

4. An article of manufacturing, comprising:
a computer usable medium having computer readable code means embodied therein for controlling interactive video-on demand files through a video dial tone network and set top boxes to a plurality of subscribers, the computer readable program code means in said article of manufacturing comprising:
   a) computer readable program code means for activating the set top box coupled to a display terminal and a first interface;
   b) computer readable program code means for connecting the set top box to the video dial tone network including a control channel and a data channel;
   c) computer readable program code means in a first gateway responsive to the video dial tone network to establish a video session between the set top box and the interactive video on demand files in a video server using the control channel;
   d) computer readable program code means for storing an application as panels expressed as data in a database where the data defines an event list, hot spot navigation map and panel object description; and
   e) computer readable program code means in an application server coupled to the database for interacting with the video server in the video session using application libraries to deliver over the data channel an application selected by a subscriber for viewing on the display through the set top box, the set top boxes including an event handler coupled to an event queue; a vcr agent and a graphics agent.

5. The interactive video system of claim 3 wherein the control channel is a bid-directional channel between the first gateway and the set top box for purposes of transferring messages therebetween.

6. The interactive video system of claim 5 wherein the first gateway controls the establishment of a video session between the video server and the display terminal.

7. The interactive video system of claim 6 further comprising an application server coupled to the first gateway and the video server, the application server containing executable code for transferring video and audio information from the video server to the display terminal.

8. The interactive video system of claim 7 wherein the video server comprises a control server and a data server.

9. The interactive video system of claim 8 wherein the second gateway establishes a connection between the video server and the set top box over the data channel in response to an input from the first gateway.

10. The interactive video system of claim 9 wherein the set top box includes memory for storing an operating system and set top enabling code.

11. The interactive video system of claim 10 wherein the control server starts and stops the data server in response to commands from the first gateway.

12. The interactive video system of claim 11 wherein the data server includes storage means and responds to commands from the control server to locate video information in the storage means.

13. The interactive video system of claim 12 wherein the storage means includes an A buffer and a B buffer for transferring data from the data server to the display terminal.

14. The interactive video system of claim 13 wherein the application server includes a shared queue coupled to a plurality of application engines and set top boxes, and stored program instructions for a multi-tasking operating system.

15. The interactive video system of claim 14 further comprising application code for operating the application engines in response to application tables indicative of a state of a set top box in a video session.

16. The interactive video system of claim 15 further comprising video storage means for storing video data in panels.

17. The interactive video system of claim 16 wherein the second gateway includes a shared queue manager coupled to an application executor in the application server and an application message router, the router containing stored program instructions for i) handling all messages and protocols for the video dial tone network; ii) handling all incoming and outgoing messages for the set top box through the control channel and iii) interpreting the messages received by i) and ii) in connection with establishing a video session, an operating system for controlling the operation of i), ii), and iii).

18. The interactive video system of claim 16 wherein the set top box comprises an operating system, a library of digital audio video interface devices, a player shell to boot up the set top box when the set top is powered on.

19. The interactive video system of claim 18 wherein the set top box further comprises an event sequencer responsive to selected device interfaces and the player shell, the sequencer capturing and interpreting messages on the selected interfaces where the messages relates to events applicable to the display terminal.

20. The interactive video system of claim 19 wherein the set top box further comprises an event handler coupled to the event queue; a vcr agent and a graphics agent.

21. The interactive video system of claim 1 wherein the event handler comprises an event command handler; an event reporter; a message router a programming interface for interacting with the vcr and graphic agents.

* * * * *